(12) United States Patent
Seok et al.

(10) Patent No.: US 9,520,763 B2
(45) Date of Patent: Dec. 13, 2016

(54) ACTIVE ENERGY HARVESTING DEVICE

(71) Applicant: CHUNG-ANG UNIVERSITY INDUSTRY-ACADEMIC COOPERATION FOUNDATION, Seoul (KR)

(72) Inventors: Jong Won Seok, Gyeonggi-do (KR); Wan Sun, Seoul (KR); Pil Kee Kim, Gangwondo (KR); Jee Hyun Jung, Seoul (KR)

(73) Assignee: CHUNG-ANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 307 days.

(21) Appl. No.: 14/529,145

(22) Filed: Oct. 31, 2014

(65) Prior Publication Data

US 2015/0280538 A1    Oct. 1, 2015

(30) Foreign Application Priority Data

Mar. 27, 2014 (KR) .................. 10-2014-0035709

(51) Int. Cl.
*H02K 35/02* (2006.01)

(52) U.S. Cl.
CPC ........... *H02K 35/02* (2013.01); *H02K 2213/09* (2013.01)

(58) Field of Classification Search
CPC .................. H02K 35/02; F03G 7/08
IPC ...................................... H02K 35/02
See application file for complete search history.

(56) References Cited

U.S. PATENT DOCUMENTS

| 6,971,491 B1 * | 12/2005 | Gordaninejad ......... F16F 9/535 188/267.2 |
| 8,299,659 B1 * | 10/2012 | Bartol, Jr. .............. H02K 35/02 310/152 |
| 2008/0297119 A1 * | 12/2008 | Frayne ..................... F03B 5/00 322/3 |

\* cited by examiner

*Primary Examiner* — Thomas Truong
(74) *Attorney, Agent, or Firm* — The PL Law Group, PLLC

(57) ABSTRACT

Disclosed is an active energy harvesting device. The device includes a rigid body configured to vibrate corresponding to vibration of an external vibration body and including a first end at which an energy harvesting structure is provided to convert mechanical energy into electric energy, a magneto-rheological material provided at a second end of the rigid body to be bound to the rigid body and including a material which is changed in elastic force according to the surrounding magnetic field strength, a fixing unit for binding the second end of the rigid body and the magneto-rheological material and connecting the rigid body to the external vibration body, and a first permanent magnet arranged symmetrically apart from the magneto-rheological material while interposing the magneto-rheological material therebetween and provided so as to adjust a gap from the magneto-rheological material and change an elastic coefficient of the magneto-rheological material according to the gap.

7 Claims, 4 Drawing Sheets

ACTIVE ENERGY HARVESTING DEVICE

BACKGROUND

1. Field of the Invention

The present invention relates to an energy harvesting device for converting kinetic energy caused by external vibration into electric energy and, more particularly, to a technology of maximizing energy harvesting efficiency by means of an energy harvesting device having a structure such that an inherent vibration frequency thereof coincides with an external vibration frequency so as to generate resonance.

2. Description of the Related Art

Recently, a remarkable growth of industries related to energy saving and renewable energy is being accelerated. Accordingly, research on energy saving and utilization of new energy harvesting sources through harvest of consumed energy and conversion of the harvested energy into usable energy such as electric power, etc. is being conducted.

Especially, research on an energy harvesting device for generating power by harvesting kinetic energy caused by external motion is also being widely conducted. Representative energy harvesting devices include the following technologies: (1) including a piezoelectric element and converting kinetic energy generated when an element having a predetermined mass moves by external vibration into electric energy through a piezoelectric effect of the piezoelectric element, or (2) converting induced electromotive force generated by electromagnetic induction by movement of an element into electric energy.

A conventional energy harvesting device includes a cantilever-type vibration body having a fixed end and a free end capable of free motion, and a piezoelectric element or a magnet-coil structure mounted to the free end. Such a conventional energy harvesting device harvests energy by charging a power storage unit with electricity generated by piezoelectric effect or electromagnetic induction as the vibration body vibrates.

The vibration body of the energy harvesting device has an inherent vibration frequency according to vibration characteristics. When the external vibration frequency and the inherent vibration frequency of the vibration body of the energy harvesting device coincide and thus resonance is generated, energy harvesting efficiency may be maximized. However, because the inherent vibration frequency of the vibration body is set when manufacturing the conventional energy harvesting device, in order to generate resonance corresponding to the external vibration frequency which varies depending on the mounting position, the inherent vibration frequency should be adjusted when producing the energy harvesting device. Further, at present, because there is no technology capable of changing the inherent vibration frequency of the vibration body to generate resonance when the external vibration frequency varies, energy harvesting efficiency is deteriorated.

SUMMARY

Therefore, it is an object of the present invention to provide an energy harvesting device capable of maximizing energy harvesting efficiency using a technology of easily changing an inherent vibration frequency of the energy harvesting device so as to generate resonance corresponding to an external vibration frequency.

In accordance with an aspect of the present invention, the above and other objects can be accomplished by the provision of an active energy harvesting device comprising: a rigid body configured to vibrate corresponding to vibration of an external vibration body and including a first end at which an energy harvesting structure is provided to convert mechanical energy due to vibration into electric energy; a magneto-rheological material provided at a second end of the rigid body opposite to the first end so as to be bound to the rigid body and including a material which is changed in elastic force according to the surrounding magnetic field strength; a fixing unit for binding the second end of the rigid body and the magneto-rheological material and connecting the rigid body to the external vibration body to achieve vibration transmission; and a first permanent magnet arranged symmetrically apart from the magneto-rheological material while interposing the magneto-rheological material therebetween and provided so as to adjust a gap from the magneto-rheological material and change an elastic coefficient of the magneto-rheological material according to the gap.

As is apparent from the above description, in the rigid body connected to the external vibration body and configured to vibrate corresponding to vibration of the external vibration body, when harvesting energy as the first end vibrates with respect to the second end, elastic force acting to secure the second end can be adjusted differently depending on the gap between the first permanent magnet and the magneto-rheological material, and therefore the inherent vibration frequency of the first end, i.e., the inherent vibration frequency of the rigid body can be adjusted according to the elastic force of the second end.

Accordingly, since the inherent vibration frequency of the rigid body can be easily adjusted to coincide with the vibration frequency of the external vibration body, energy harvesting efficiency can be easily maximized irrespective of the mounting position of the energy harvesting device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, preferred embodiments of the present invention will be described in detail with reference to the annexed drawings.

Figure 1:
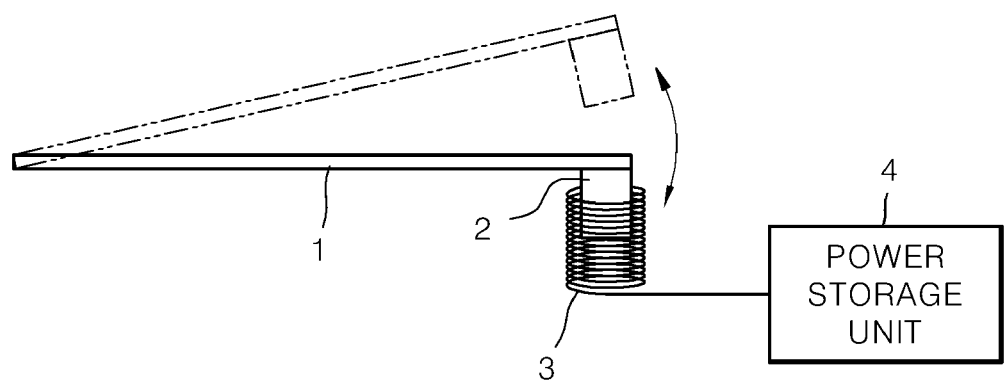
FIG. 1 is a view schematically illustrating a concept of an energy harvesting device.

FIG. 1 is a view schematically illustrating a concept of an energy harvesting device.

Before explaining the present invention in detail, a structure of a typical energy harvesting device will now be explained. A typical energy harvesting device comprises a rigid body 1 configured to vibrate, a permanent magnet 2 mounted to one end of the rigid body 1, a coil 3 configured to generate electric current by electromagnetic induction with the permanent magnet 2, and a power storage unit 4 for storing the electric current generated in the coil 3.

Operation of the energy harvesting device is carried on by securing the above structure to an external vibration body. For example, the energy harvesting device may further comprise a fixing unit (not shown) provided at the other end opposite to the end mounted with the permanent magnet 2, in order to secure the rigid body 1 and also to connect the rigid body 1 to the external vibration body to achieve vibration transmission from the external vibration body to the rigid body 1.

If the above structure is secured to the external vibration body, when the external vibration body vibrates, vibration is transmitted to the rigid body 1. At this time, the end of the rigid body 1, to which the permanent magnet 2 is mounted, acts as a free end and vibrates with respect to the fixed end.

A relative displacement between the permanent magnet 2 and the coil 3 is changed by vibration of the free end, which causes electromagnetic induction. As a result, electric current is generated in the coil 3 and stored in the power storage unit 4.

Through the above function, vibration of the external vibration body is converted into electric energy by the energy harvesting device. The rigid body 1 has an inherent vibration frequency by elastic properties of the fixing unit provided at the fixed end thereof and elastic properties of the rigid body 1. When the inherent vibration frequency of the rigid body 1 and the vibration frequency of the external vibration body coincide and thus resonance is generated, larger vibration energy is generated and accordingly the amount of electric energy generated in the coil 3 is increased. As a result, energy harvesting efficiency per time is maximized.

However, the above-described conventional energy harvesting device cannot adjust an elastic coefficient of the fixed end. In other words, because the elastic coefficient is set when manufacturing the conventional energy harvesting device, the inherent vibration frequency of the rigid body 1 cannot be adjusted when the vibration frequency of the external vibration body varies. In reality, it is impossible that the inherent vibration frequency of the rigid body 1 and the vibration frequency of the external vibration body generate resonance, and thus energy harvesting efficiency of the energy harvesting device is deteriorated.

Figure 2:
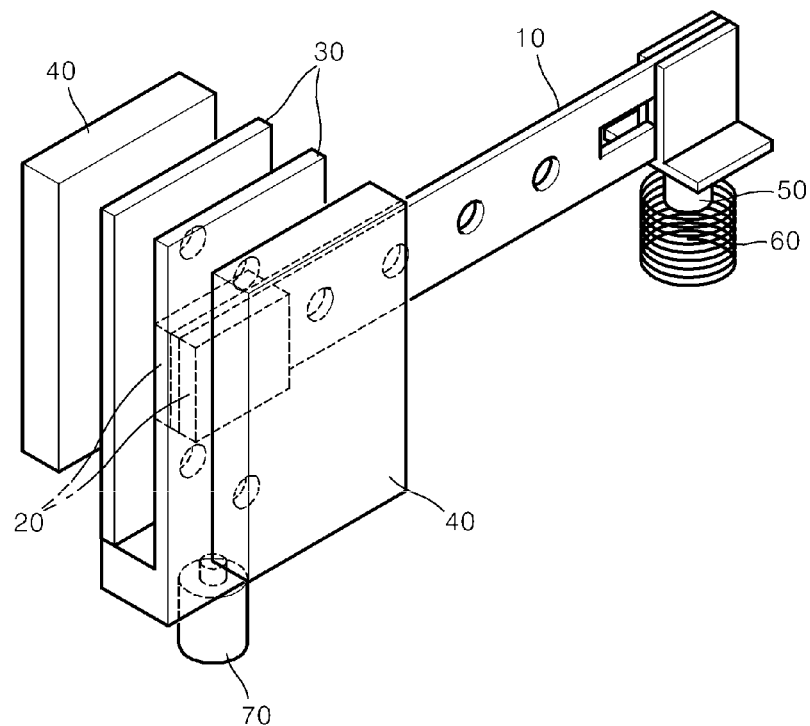
FIG. 2 is a perspective view illustrating a structure of an active energy harvesting device according to an embodiment of the present invention.

FIG. 2 is a perspective view illustrating a structure of an active energy harvesting device according to an embodiment of the present invention.

Comparing the structure shown in FIG. 2 with that in FIG. 1, a rigid body 10, a second permanent magnet 50 and a coil 60 are similar to those in FIG. 1, however, a structure of the fixed end is different from that in FIG. 1.

An active energy harvesting device according to an embodiment of the present invention comprises a rigid body 10 configured to vibrate according to vibration transmitted from the external vibration body and having an energy harvesting structure 50 and 60 provided at a first end thereof in order to convert mechanical energy due to vibration into electric energy.

The energy harvesting structure 50 and 60, as mentioned above with reference to FIG. 1, serves to convert vibration energy into electric energy using electromagnetic induction, and preferably includes a second permanent magnet 50, a coil unit 60 for generating electric energy by electromagnetic induction caused by relative motion (due to vibration) of the second permanent magnet 50, and a power storage unit (not shown) for storing the electric energy generated in the coil unit 60.

The active energy harvesting device further comprises a magneto-rheological material 20 that is attached to a second end of the rigid body 10 opposite to the first end mounted with the second permanent magnet 50.

The magneto-rheological material 20 refers to a material which is changed in elastic coefficient according to the surrounding magnetic field strength. Preferably, in this embodiment of the present invention, the magneto-rheological material 20 may include a solid-type magneto-rheological elastomer (MRE) for attachment to the rigid body 10 and a fixing unit 30 which will be described later and for elastically securing the rigid body 10.

Alternatively, the magneto-rheological material 20 may include a liquid-type magneto-rheological fluid (MRF). In this case, a case (not shown) for accommodating the magneto-rheological fluid may be further provided.

The active energy harvesting device according to an embodiment of the present invention further comprises a fixing unit 30 to secure the magneto-rheological material 20 to the second end of the rigid body 10 and to connect the rigid body 10 to an external vibration body 70 so that vibration can be transmitted from the external vibration body 70 to the rigid body 10.

As shown in FIG. 2, the fixing unit 30 may include a pair of fixing parts arranged symmetrically to interpose the rigid body 10 therebetween and connect the rigid body 10 to the external vibration body 70 for vibration transmission, and a binding means for binding the rigid body 10, the fixing parts and the magneto-rheological material 20.

The binding means may have any constitution capable of binding the rigid body 10, the fixing parts and the magneto-rheological material 20. In other words, any one of chemical bonding using an adhesive means and mechanical bonding using bolt engagement, etc. may be used. The binding means has a constitution for binding the rigid body 10, the fixing parts and the magneto-rheological material 20 so that these components are elastically bound according to the elastic coefficient of the magneto-rheological material 20 and the rigid body 10 can vibrate with an inherent vibration frequency according to the elastic coefficient of the magneto-rheological material 20.

The magneto-rheological material 20, as shown in FIG. 2, may be provided in pairs that are elastically bound to the rigid body 10 and disposed between the fixing parts and the rigid body 10 so that the first end of the rigid body 10 vibrates with respect to the second end according to vibration transmitted from the external vibration body 70.

In this embodiment shown in FIG. 2, the reason for symmetrically arranging the fixing unit 30 and the magneto-rheological materials 20 on both sides of the rigid body 10 is to enable the rigid body 10 to vibrate vertically. If the fixing unit 30 and the magneto-rheological materials 20 are not arranged symmetrically on both sides of the rigid body 10, one side of the rigid body 10 has different elastic properties from the other side thereof according to the elastic coefficient of the magneto-rheological materials 20, and thus the first end of the rigid body 10 cannot vibrate vertically.

Referring again to FIG. 2, the active energy harvesting device according to an embodiment of the present invention further comprises a first permanent magnet 40.

The first permanent magnet 40, as shown in FIG. 2, is provided such that two opposite poles thereof are symmetrically arranged apart from the magneto-rheological materials 20 while interposing the magneto-rheological materials 20 therebetween. A gap between the first permanent magnet 40 and the magneto-rheological material 20 can be adjusted. According to the features of the magneto-rheological materials 20, if the gap from the first permanent magnet 40 is adjusted, the elastic coefficient of the magneto-rheological materials 20 is changed depending on the gap.

As described above, the magneto-rheological materials 20 are changed in elastic coefficient according to the surrounding magnetic field strength. That is, the first permanent magnet 40 is a component for controlling the elastic coefficient of the magneto-rheological materials 20.

Through simple manipulation of adjusting the gap between the first permanent magnet 40 and the magneto-rheological material 20, the elastic coefficient of the magneto-rheological materials 20 is changed, which results in change in inherent vibration frequency of the rigid body 10.

In other words, the present invention is constituted such that the elastic coefficient of the magneto-rheological materials 20 is set so that the vibration frequency of the external vibration body 70 and the inherent vibration frequency of the rigid body 10 coincide by adjusting the gap between the first permanent magnet 40 and the magneto-rheological material 20, thereby controlling the inherent vibration frequency of the rigid body 10. Accordingly, since the vibration frequency of the external vibration body 70 can be measured and the inherent vibration frequency of the rigid body 10 can be simply set corresponding to the measured vibration frequency, an energy harvesting device having maximized energy harvesting efficiency may be provided.

Figure 3:
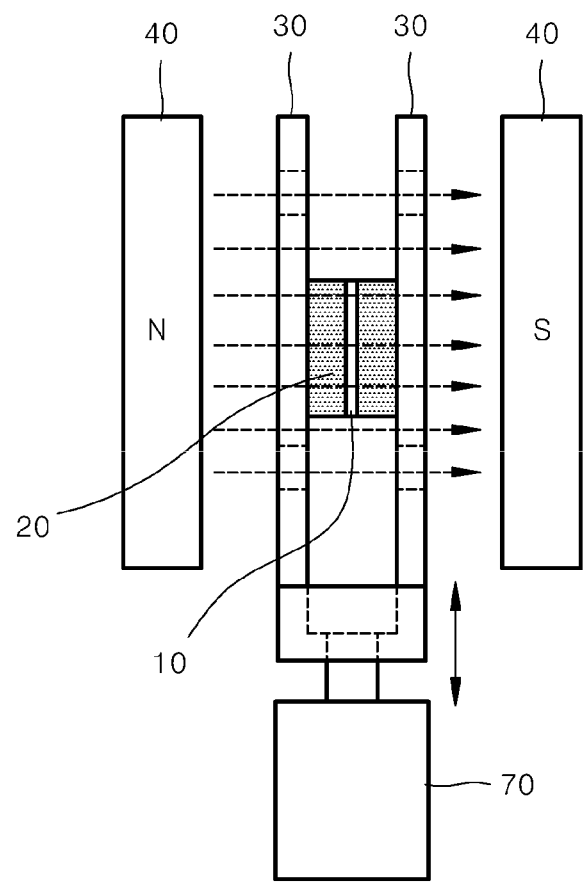
FIGS. 3 and 4 are cross-sectional views of the active energy harvesting device according to the embodiment depicted in FIG. 1.
Figure 4:
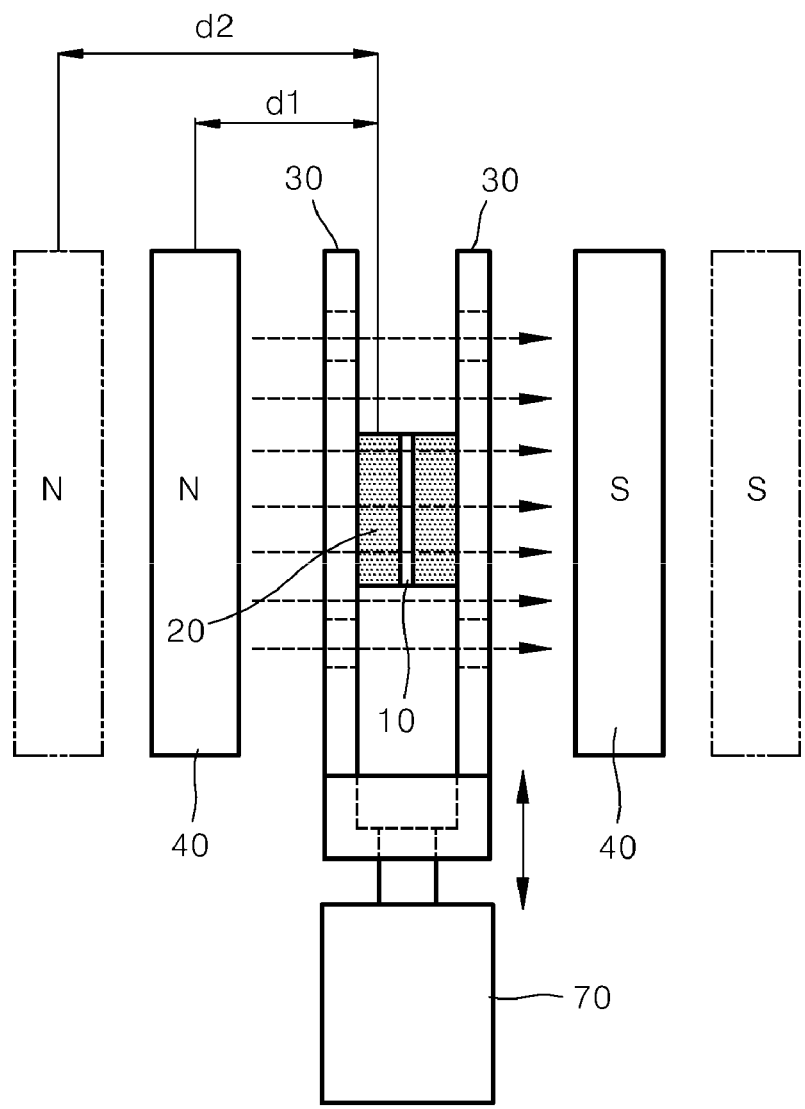

FIGS. 3 and 4 are cross-sectional views of the active energy harvesting device according to the embodiment depicted in FIG. 1. In particular, FIGS. 3 and 4 illustrate a cross-section of the second end of the rigid body 10 of the active energy harvesting device according to the embodiment depicted in FIG. 1.

It can be observed from FIGS. 3 and 4 that a pair of components are provided to bind the magneto-rheological materials 20 symmetrically while interposing the rigid body 10 therebetween.

As described above, the fixing unit 30 includes a pair of fixing parts arranged symmetrically to interpose the magneto-rheological materials 20 therebetween, and a binding means for binding the rigid body 10, the magneto-rheological materials 20 and the fixing parts. The fixing unit 30 is connected to the external vibration body 70 so as to transmit vibration from the external vibration body 70 to the rigid body 10.

The first permanent magnet 40, as shown in FIG. 3, is provided such that two opposite poles are symmetrically arranged apart from the magneto-rheological materials 20 while interposing the magneto-rheological materials 20 therebetween.

As shown in FIG. 4, the gap between the first permanent magnet 40 and the magneto-rheological material 20 can be diversely changed from d1 to d2. Comparing the case of gap d1 and the case of gap d2, the magnetic field strength applied from the first permanent magnet 40 to the magneto-rheological materials 20 varies. Accordingly, the elastic coefficient of the magneto-rheological materials 20 is changed, and resultantly the inherent vibration frequency of the rigid body 10 is also changed.

Based on the above function, resonance is generated by adjusting the elastic coefficient of the magneto-rheological materials 20 so that the inherent vibration frequency of the rigid body 10 coincides with the external vibration frequency, thereby maximizing energy harvesting efficiency.

Figure 5:
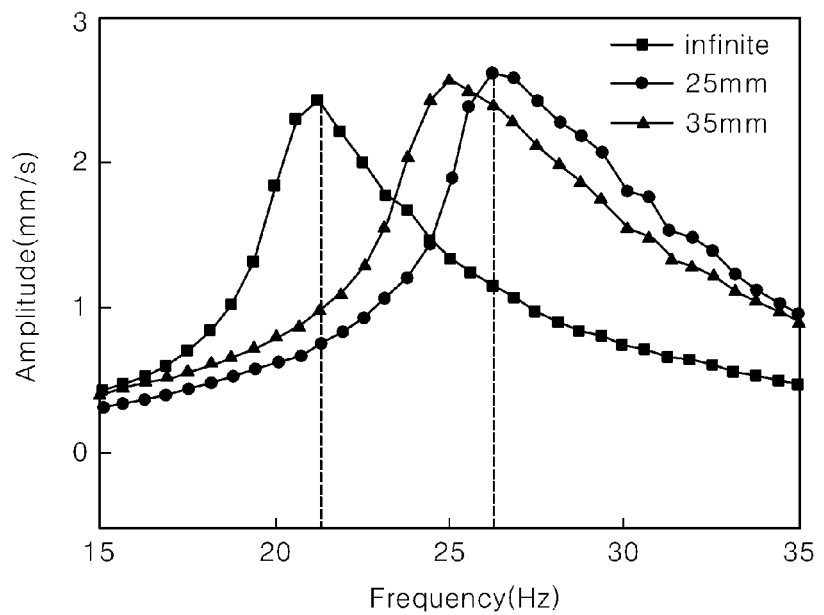
FIGS. 5 and 6 are graphs indicating simulation results of the active energy harvesting device according to an embodiment of the present invention.
Figure 6:
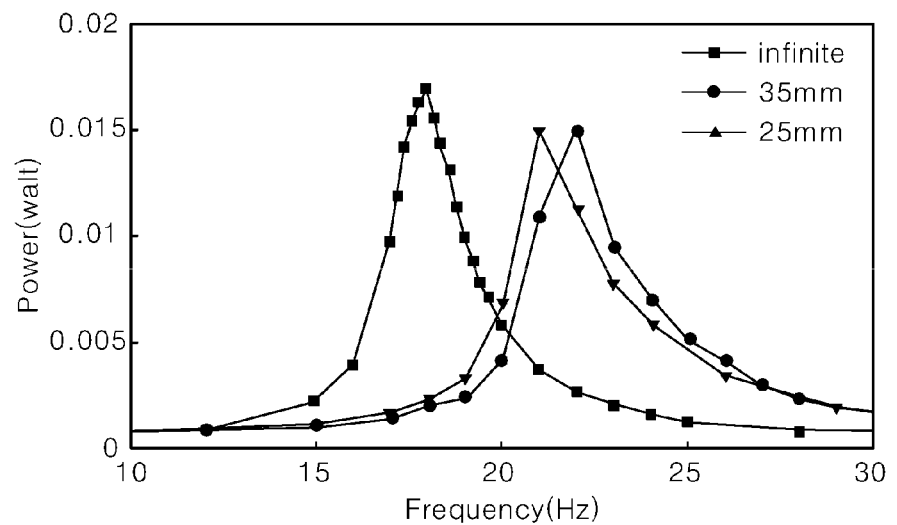

FIGS. 5 and 6 are graphs indicating simulation results of the active energy harvesting device according to an embodiment of the present invention.

FIG. 5 shows simulation results related to vibration amplitude characteristics of the rigid body when adjusting the gap between the first permanent magnet and the magneto-rheological material in a structure without the coil. Three graphs in FIG. 5 respectively indicate frequency-amplitude characteristics when the gap between the first permanent magnet and the magneto-rheological material is 35 mm and 25 mm and when the first permanent magnet is not provided.

It can be understood from FIG. 5 that the frequency at which the amplitude of the rigid body is the largest, i.e., the inherent vibration frequency varies depending on the gap between the first permanent magnet and the magneto-rheological material. If the frequency causing the largest amplitude of the rigid body is set to coincide with the frequency properties of the external vibration body, the further increased response characteristics due to resonance are observed.

On the other hand, three graphs in FIG. 6 indicate frequency-power characteristics in a structure with the coil. Response characteristics can be observed from FIG. 6 such that the frequency causing the highest power varies depending on the gap between the first permanent magnet and the magneto-rheological material.

Even though it was described in the above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "comprising," "including," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

What is claimed is:
1. An active energy harvesting device comprising:
a rigid body configured to vibrate corresponding to vibration of an external vibration body and including a first end at which an energy harvesting structure is provided to convert mechanical energy due to vibration into electric energy;
a magneto-rheological material provided at a second end of the rigid body opposite to the first end so as to be bound to the rigid body and including a material which is changed in elastic force according to the surrounding magnetic field strength;

a fixing unit for binding the second end of the rigid body and the magneto-rheological material and connecting the rigid body to the external vibration body to achieve vibration transmission; and a first permanent magnet arranged symmetrically apart from the magneto-rheological material while interposing the magneto-rheological material therebetween and provided so as to adjust a gap from the magneto-rheological material and change an elastic coefficient of the magneto-rheological material according to the gap.

2. The active energy harvesting device according to claim 1, wherein the energy harvesting structure includes a second permanent magnet bound to the first end of the rigid body, a coil unit configured to generate electric energy by electromagnetic induction caused by relative motion of the second permanent magnet, and a power storage unit configured to store the electric energy generated in the coil unit.

3. The active energy harvesting device according to claim 1, wherein the fixing unit includes a pair of fixing parts arranged symmetrically to interpose the rigid body therebetween and connect the rigid body to the external vibration body for vibration transmission, and a binding means for binding the rigid body, the fixing parts and the magneto-rheological material.

4. The active energy harvesting device according to claim 3, wherein the magneto-rheological material is provided in pairs that are elastically bound to the rigid body and disposed between the fixing parts and the rigid body so that the first end of the rigid body vibrates with respect to the second end according to vibration transmitted from the external vibration body.

5. The active energy harvesting device according to claim 1, wherein the magneto-rheological material includes a solid-type magneto-rheological elastomer which is changed in elastic force according to the surrounding magnetic field strength.

6. The active energy harvesting device according to claim 1, wherein the magneto-rheological material includes a liquid-type magneto-rheological fluid which is changed in elastic force according to the surrounding magnetic field strength, and the active energy harvesting device further comprises a case for accommodating the magneto-rheological fluid.

7. The active energy harvesting device according to claim 1, wherein the gap between the first permanent magnet and the magneto-rheological material is adjusted to set the elastic coefficient of the magneto-rheological material so that a vibration frequency of the external vibration body and an inherent vibration frequency of the rigid body coincide.

* * * * *